(12) United States Patent
Okwudire et al.

(10) Patent No.: US 11,231,070 B2
(45) Date of Patent: Jan. 25, 2022

(54) AXIALLY COMPLIANT BEARING FOR PRECISION POSITIONING

(71) Applicant: THE REGENTS OF THE UNIVERSITY OF MICHIGAN, Ann Arbor, MI (US)

(72) Inventors: Chinedum E. Okwudire, Ann Arbor, MI (US); Xin Dong, Ann Arbor, MI (US); Dongwoo Kang, Ann Arbor, MI (US)

(73) Assignees: THE REGENTS OF THE UNIVERSITY OF MICHIGAN, Ann Arbor, MI (US); Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 17/063,273

(22) Filed: Oct. 5, 2020

(65) Prior Publication Data

US 2021/0048067 A1 Feb. 18, 2021

Related U.S. Application Data

(63) Continuation-in-part of application No. 15/772,952, filed as application No. PCT/US2016/060033 on Nov. 2, 2016, now Pat. No. 10,837,492.

(Continued)

(51) Int. Cl.
*H02K 7/09* (2006.01)
*F16C 32/04* (2006.01)

(52) U.S. Cl.
CPC ............................. *F16C 32/0442* (2013.01)

(58) Field of Classification Search
CPC ........ H02K 7/09; H02K 7/08; H02K 2201/18; F16C 32/041; F16C 32/0423; F16C 29/08
See application file for complete search history.

(56) References Cited

U.S. PATENT DOCUMENTS

| 5,314,254 A | 5/1994 | Yashar et al. |
| 10,281,829 B2 | 5/2019 | Okwudire et al. |

(Continued)

FOREIGN PATENT DOCUMENTS

| FR | 2959345 A1 | 10/2011 |
| JP | H0915359 A | 1/1997 |

(Continued)

OTHER PUBLICATIONS

International Search Report and Written Opinion issued in PCT/US2016/060033, dated Mar. 31, 2017; ISA/KR.

(Continued)

*Primary Examiner* — Dang D Le
(74) *Attorney, Agent, or Firm* — Harness, Dickey & Pierce, P.L.C.

(57) ABSTRACT

A rotationally compliant bearing roller assembly having a roller, at least one bearing member operably coupled to a base configured to support rotational movement about a rotational axis; and a rotary compliant joint interconnecting the at least one bearing member to the roller. The rotary compliant joint having a first compliance in a rotational direction about the rotational axis to permit movement of the roller in the rotational direction relative to the at least one bearing member, such that the first compliance being greater than a friction induced compliance of the at least one bearing member in the rotational direction. The compliant joint having a second compliance in a direction orthogonal to the rotational direction, such that the second compliance being less than the first compliance.

18 Claims, 13 Drawing Sheets

Related U.S. Application Data

(60) Provisional application No. 62/249,589, filed on Nov. 2, 2015.

(56) References Cited

U.S. PATENT DOCUMENTS

| | | | |
|---|---|---|---|
| 10,837,492 B2 * | 11/2020 | Okwudire | F16C 29/008 |
| 2002/0074516 A1 | 6/2002 | Novak et al. | |
| 2004/0207830 A1 | 10/2004 | Galburt | |
| 2005/0231075 A1 | 10/2005 | Xu | |
| 2011/0193510 A1 | 8/2011 | Fleming | |
| 2013/0207328 A1 | 8/2013 | Awtar et al. | |

FOREIGN PATENT DOCUMENTS

| | | | |
|---|---|---|---|
| JP | 2002323584 A | 11/2002 | |
| JP | 2005072606 A | 3/2005 | |
| JP | 2005150753 A | 6/2005 | |

OTHER PUBLICATIONS

Translation of Office Action issued in Japanese Application No. 2018-522773 dated Jul. 31, 2020.

\* cited by examiner

AXIALLY COMPLIANT BEARING FOR PRECISION POSITIONING

CROSS-REFERENCE TO RELATED APPLICATIONS

This application is a continuation-in-part of U.S. patent application Ser. No. 15/772,952 filed on May 2, 2018, which is a National Stage of International Application No. PCT/US2016/060033 filed on Nov. 2, 2016, which claims the benefit of U.S. Provisional Application No. 62/249,589, filed on Nov. 2, 2015. The entire disclosure of the above applications are incorporated herein by reference.

FIELD

The present disclosure relates to a motion system and, more particularly, relates to a motion stage equipped with an axially compliant rolling bearing and/or a rotary system equipped with a rotary compliant system.

BACKGROUND AND SUMMARY

This section provides background information related to the present disclosure which is not necessarily prior art. This section provides a general summary of the disclosure, and is not a comprehensive disclosure of its full scope or all of its features.

Precision motion stages are designed for precise positioning in various manufacturing processes. Among the bearing options for precision stages, rolling bearings are the most cost effective, especially for applications requiring large motion range and vacuum compatibility. However, the presence of nonlinear friction adversely affects the precision and speed of rolling bearing guided stages. The state of art in addressing this problem is to perform model-based friction compensation, which suffer from robustness problems, thus limiting their usefulness in practice. This invention addresses the problem of nonlinear effect of friction in rolling bearing guided stages by using compliant joint(s) to provide a simple, model-free and potentially low-cost approach.

In some embodiments according to the principles of the present teachings, a precision motion stage equipped with an axially compliant roller bearing is provided having a stage, at least one bearing slidably disposed along a rail, and a compliant joint interconnecting the at least one bearing to the stage. The compliant joint is sufficiently compliant to permit movement of the stage in the desired motion direction (i.e., axial direction) while remaining stiff in other orthogonal directions to maintain the high rigidity of the bearings.

Similarly, high precision roll-to-roll processes are one of the most promising technologies for manufacturing flexible and large-area thin film electronics. However, broadband frictional disturbances caused by the guiding ball bearings affect the precision of the processing roller 116 in the roll-to-roll system, severely hampering the quality of the manufactured products. Conventional feedback control techniques encounter difficulties in mitigating the broadband frictional disturbances.

In some embodiments according to the principles of the present teachings, a rotary system for high-precision roll-to-roll manufacturing process is provided. A rotary compliant joint, being a robust and cost-effective mechatronics system, is implemented in the roll-to-roll manufacturing system to mitigate the undesirable effects of friction during continuous printing processes. Frequency domain analysis shows that the rotary system with one or more rotary compliant joints achieves significantly improved attenuation of frictional disturbance, compared to the case without it. In some embodiments, a rotary compliant joint is designed and optimized to minimize the adverse effects of bearing friction without overly sacrificing the high rigidity of the machine. It has been demonstrated that the present teachings provide up to 61% reduction in root mean square (RMS) tracking error during constant velocity motion, compared to a conventional roll-to-roll system without one or more rotary compliant joints.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
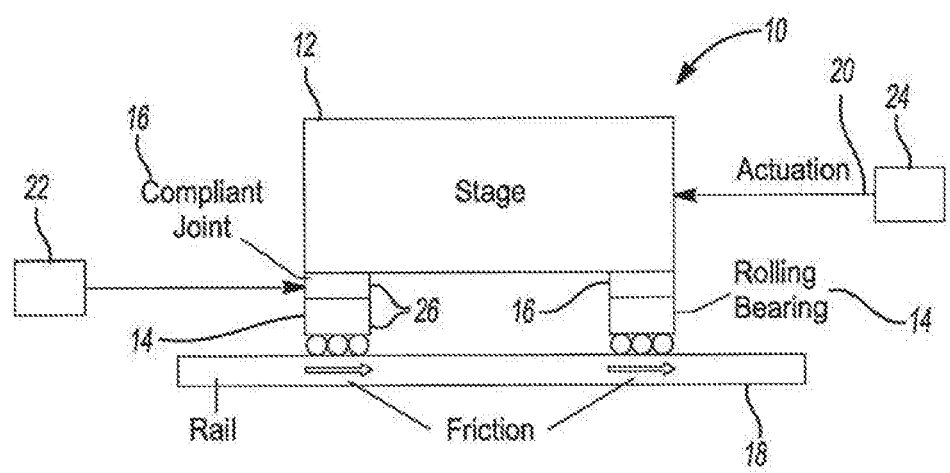
FIG. 1 is a schematic view of an axially compliant rolling bearing precision motion stage according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Introduction and Motivation

Precision motion stages are used for precise positioning in manufacturing processes, ranging from conventional machining to semiconductor fabrication and inspection. Precision stages can be classified into four broad categories based on the type of bearings they use:

Flexure bearings

Magnetic levitation (maglev) bearings

Fluidic bearings (hydrostatic and aerostatic)

Mechanical bearings

It should be understood that mechanical bearings can include both rolling and sliding bearings. Generally, rolling bearings are more common. In the interest of discussion, rolling bearing will be described in detail herein. However, this should not be regarded as limiting the scope of the present disclosure and claim, unless specifically claimed as such.

Flexure bearings are friction free and vacuum/cleanroom compatible, but are suitable only for short-stroke motion (<1 mm) applications, which are not of interest to this invention. For long-stroke applications (>25 mm), the choice is generally between maglev, fluidic, and rolling bearings.

Maglev stages are essentially friction free, but are very expensive. They are used only in the highest end, multi-million dollar stages, e.g., wafer scanners for photolithography (made by companies like ASML Holdings, Ultratek Inc., Nikon). They have not gained widespread commercial acceptance for most other applications of precision stages due to their cost barrier and complexities.

Fluidic bearings can either be hydrostatic or aerostatic. Hydrostatic bearings employ pressurized oil while aerostatic bearings use a thin film of pressurized air to reduce the friction between sliding surfaces. Hydrostatic bearings provide reduced friction and excellent damping characteristics but are unsuitable for cleanroom environments, where a lot of precision stages are used, because oil can easily create contaminants. Aerostatic (or air) bearings have a minimal amount of friction. They are also cleanroom-compatible and are relatively much cheaper than maglev bearing stages. However, they are not vacuum compatible, which makes them unsuitable for the growing number of applications of precision stages that must be performed in ultrahigh vacuum (UHV), e.g., electron microscopy, thin-film sputtering and focused ion beam. Moreover, they suffer from in-position stability issues due to the jitter (aka 'air hammering') generated by the airflow through the bearings.

Rolling bearings are the most cost-effective of the various options. They can provide accuracies comparable to air bearing stages for motion ranges less than 300 mm and they have excellent in-position stability. When lubricated with small amounts of grease, they do not create any significant contamination in cleanroom environments. Examples of commercial rolling-bearing-based motion stages include the ANT Series from Aerotech Inc. and the XM Series from Newport Corporation. They are very attractive as a lower cost alternative to air bearing stages for a wide range of precision positioning applications, and are currently the only viable alternative to maglev bearings for applications that require vacuum-compatibility. However, the presence of nonlinear friction adversely affects the stage precision and speed in both the macro- (i.e., sliding) and micro-displacement (i.e., pre-sliding) regimes of friction.

In the sliding regime, friction can be characterized by the Stribeck curve, consisting of static, Coulomb and viscous friction. Stick-slip is a common phenomenon that occurs due to the highly nonlinear behavior at velocity reversals. Its effect is often noticeable as spikes (glitches) at quadrant locations when generating circular motions using a motion stage. On the other hand, in the pre-sliding regime, friction behaves as a nonlinear spring due to elastic deformations between rolling/sliding elements. This becomes dominant as the stage gets within microns of its desired position, resulting 5-10 times longer settling time than equivalent frictionless stages in point-to-point positioning. Such long settling times severely hamper the throughput of the processes for which rolling bearing guided stages are used.

STATE OF THE ART

Avoidance and compensation are the two primary ways of mitigating the nonlinear effects of friction. For example, nonlinear friction can be avoided via bearing/lubricant selection and reduction of the number of rubbing mechanical elements. When friction cannot be completely avoided, further reduction of its adverse effects can be achieved by model-free and/or model-based compensation techniques.

Model-free approaches make use of high gain feedback control (e.g., stiff PD or high integral gain) to increase disturbance rejection, but they make the systems prone to instability due to sensor noise and modeling errors. Model-based techniques generate compensatory control forces using approximate models of friction, through feed forward or feedback controllers.

In feed forward friction compensation (FF-FC), a prediction of the impending frictional force is made using a model of the frictional behavior of the stage combined with the reference velocity of the stage. The predicted frictional force is then injected into the control input of the stage to pre-emptively cancel out the actual friction of the stage. FF-FC works very well if the friction model is very accurate. However, the problem is that friction, particularly at the pre-sliding regime, is very temperamental and difficult to model accurately. Therefore, FF-FC methods suffer from poor robustness which could easily degrade their performance. Model parameter adaptation has been tried as a solution to this problem but convergence of adaptation schemes is often difficult and slow because the identification signals are often not rich (or persistent) enough. Another major problem with FF-FC methods is that they depend on the reference velocity to predict friction. When the stage is trying to settle to a desired position, the reference velocity is zero, even though the actual velocity is not. Therefore, even if the friction model is accurate, the disparity between the reference and actual velocities hampers the performance of FF-FC methods when it comes to improving settling performance.

In feedback friction compensation (FB-FC), the actual states (e.g., velocity, position) of the system are utilized (alongside the reference states) to predict and cancel out the force of friction. This alleviates the problem related to having a stagnant velocity command during settling in FF-FC schemes. However, the use of feedback could destabilize the control system for the precision stage.

Feedback friction compensation approaches make use of actual states (e.g., position and velocity) of the system to improve disturbance rejection, using gain scheduling controllers, friction observers, etc. FB-FC methods that employ a model of friction (e.g., observer-based methods, gain scheduling controllers, etc.) suffer from robustness issues due to the variability of friction. Several methods have been proposed in the literature for improving the robustness of model-based friction compensation methods through model parameter adaptation. However, the convergence of adaptation schemes is often unreliable and slow because the identification signals are not rich (or persistent enough).

Concepts of Axially Compliant Rolling Bearing Stage

The present teachings propose a simple, model-free approach to mitigate nonlinear effect of friction in rolling bearing guided stages by the use of axially compliant joints. As illustrated in FIG. 1, an axially compliant bearing stage assembly 10 is provided having a stage member 12 is coupled to one or more bearing members 14 (e.g. mechanical bearing members such as rolling bearings and/or sliding bearings) via one or more compliant joints 16. Bearing members 14 are coupled to a rail 18 for movement relative thereto, such as rolling and/or sliding movement. In some embodiments, as illustrated, axially compliant bearing stage assembly 10 comprises stage member 12 being coupled to a plurality of bearing members 14 via compliant joint 16 disposed at each connecting interface. In some embodiments, axially compliant bearing stage assembly 10 can comprise the following features:

P-1) Each bearing member 14 is not rigidly connected to stage member 12, but is attached using a compliant joint 16 (e.g., flexure).

P-2) Compliant joint 16 provides sufficient compliance in motion direction of stage member 12 (i.e., axial direction) while remaining stiff in other orthogonal directions (i.e., horizontal and vertical). The combined stiffness of compliant joint 16 and the bearing member 14 is in the same order of magnitude as the stiffness of the bearing member 14 alone in directions orthogonal to the axial direction.

P-3) Compliant joint 16 behaves as a low pass filter which attenuates the frictional nonlinearity and hysteresis in both pre-sliding and sliding regimes.

Additional features can be used to optimize the performance of axially compliant bearing stage assembly 10 and make it more "intelligent", such as:

P-4) The damping coefficient of compliant joint 16 can be increased by attaching free and/or constrained damping layers, and/or by active damping control through the actuation force 20 of stage member 12.

P-5) An intelligent supervisory controller 22 can be used to compensate for the stiffness of compliant joint 16 in order to optimize the performance of axially compliant bearing stage assembly 10. In some embodiments, intelligent supervisory controller 22 can use estimation or measurement of bearing states to apply compensatory force. In some embodiments, intelligent supervisory controller 22 can use the knowledge of measured stage 12 position, compliant joint stiffness, combined with estimated or measured bearing 14 position to apply the compensation force in a feed forward or feedback manner.

P-6) Smart materials, such as magnetorheological or electrorheological fluids, can be added to tune the stiffness and damping of compliant joint 16 as a function of stage member 12 operation. For instance, the stiffness of compliant joint 16 can remain low during the low speed and/or small distance movements. This way, an actuator 24 exerting actuation force 20 on stage member 12 does not need to provide a large amount of force to position stage member 12. During the high speed and/or large distance movements, compliant joint 16 stiffness can be increased to mitigate negative effects arising from excessive vibrations caused by sprung masses of compliant joint 16 and bearing member 14.

P-7) Similar benefits can be achieved by adopting a progressive stiffness approach when designing the compliant components (e.g. compliant joint 16). The stiffness remains low when the displacement is small which mitigates the problematic pre-sliding friction. When large motions are experienced, the flexure (e.g. compliant joint 16) becomes very stiff and behaves likes a rigid connection between stage member 12 and bearing members 14. These additional features create a semi-active flexure mechanism, improving the performance and robustness.

P-8) Alternatively, engaging/disengaging mechanisms 26 can be added to lock compliant joint 16, thus converting compliant joint 16 into a more rigid block. During the high speed and/or large motions, the bearings 14 behave more like regular bearing members and the negative effect from oscillation of the sprung masses is mitigated.

In general, without compliant joints 16, bearing members 14 will get "stuck" when they encounter nonlinear friction in the pre-sliding regime, thereby directly affecting the precision and speed of axially compliant bearing stage assembly 10. However, with the added compliant joints 16, even when the bearing members 14 get stuck due to friction, compliant joints 16 allow stage member 12 to make small movements (μm to mm level) thus minimizing (or isolating) the effect of nonlinear friction from stage member 12. As a result, axially compliant bearing stage assembly 10 is able to achieve large-range, high-payload precise positioning with one sensor and one actuator, thus significantly reducing its cost compared to coarse-fine stage according to the prior art.

Note that, even though axially compliant bearing stage assembly 10 is depicted using a stage with one rail 18 and two bearings 14 in FIG. 1, it is applicable to other stage configurations (e.g., a stage with two rails 18 and four bearings 14, or other variations).

Simulation Based Analysis of Compliant Augmented Stage

Figure 2A:
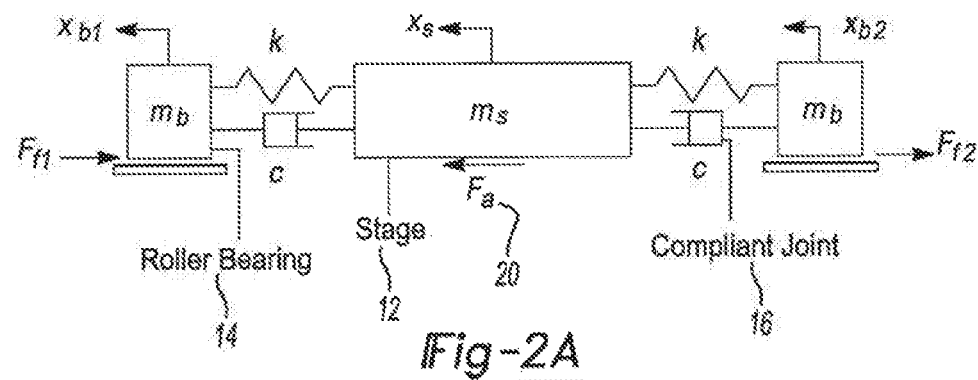
FIG. 2(a) is a three-mass model of the axially compliant rolling bearing stage according to the principles of the present teachings.

FIG. 2(a) shows a simple three-mass model of axially compliant bearing stage assembly 10 (closed-loop controlled through actuation force $F_a$). Each compliant joint 16 connecting stage member 12 of mass $m_s$ to each bearing 14 of mass $m_b$ is modeled by a spring with stiffness k and a damper with coefficient c. Friction force $F_f$ is described by the LuGre model given by $$F_f = \sigma_0 z + \sigma_1 \dot{z} + \sigma_2 \dot{x}; \quad (1)$$

$$\dot{z} = \dot{x} - \frac{|\dot{x}|}{g(\dot{x})} z;$$

$$\sigma_0 g(\dot{x}) = F_c + (F_s - F_c) e^{-(\dot{x}/v_s)^2}$$

where x represents the displacement between the two surfaces in relative motion, z is the internal friction state, $\sigma_0$ is the micro-stiffness, while $\sigma_1$ and $\sigma_2$ are respectively the micro- and macro-damping coefficients. The steady-state dynamics, $g(\dot{x})$, is characterized by the Stribeck curve with Coulomb friction $F_c$, static friction $F_s$ and the Stribeck velocity $v_s$.

Axially compliant bearing stage assembly 10 is evaluated using two case studies related to pre-sliding and sliding regimes, respectively, namely, settling behavior in point-to-point motion and tracking performance in circular motion. Simulations are carried out based on identified parameters of an in-house built precision motion stage by the inventors.

Figure 2B:
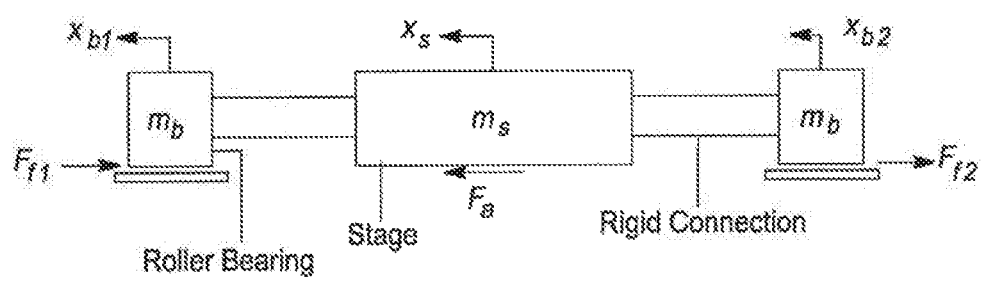
FIG. 2(b) is a three-mass model of a rolling bearing stage according to the prior art.
Figure 3B:
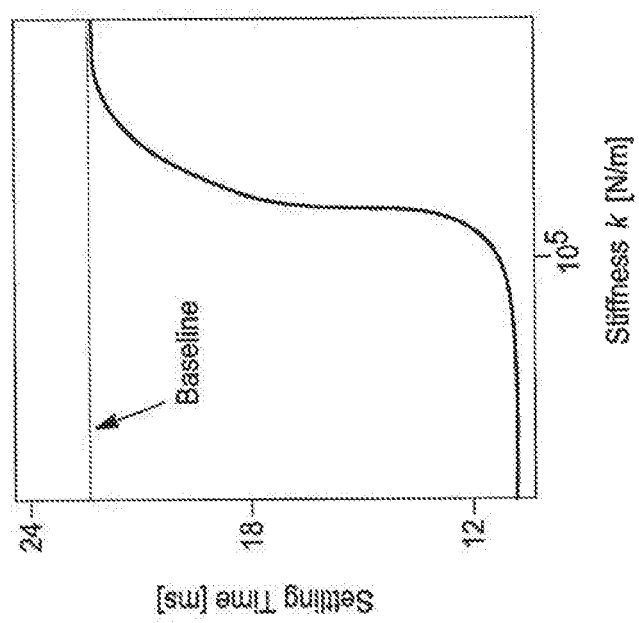
FIG. 3(b) is a graph illustrating the effect of compliant joint stiffness on settling time of the axially compliant rolling bearing stage.
Figure 3A:
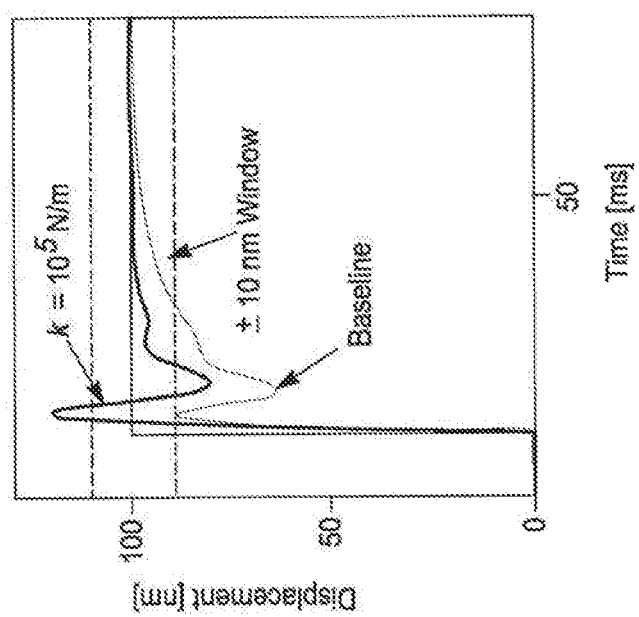
FIG. 3(a) is a graph illustrating the settling time of the axially compliant rolling bearing stage and the regular rolling bearing stage in response to a 100 nm step command.

FIG. 3(a) shows the settling behavior of axially compliant bearing stage assembly 10 to a 100 nm step command; ±10 nm is used as the settling window. As shown in FIG. 2(b), the baseline stage model has rigid connections between stage member 12 and bearing members 14. Augmenting the baseline stage, which only has bearing members 14 for guidance, with compliant joints 16 ($k=10^5$ N/m, $c=238$ N·s/m) achieves about 50% reduction in settling time. FIG. 3(b) shows the settling time as a function of the joint stiffness (with 3% damping ratio). When the joint stiffness is high, the addition of compliance provides negligible benefit, but with k below a critical stiffness, which is related to the micro-stiffness of the LuGre model, a significant reduction in settling time is achieved.

Figure 4B:
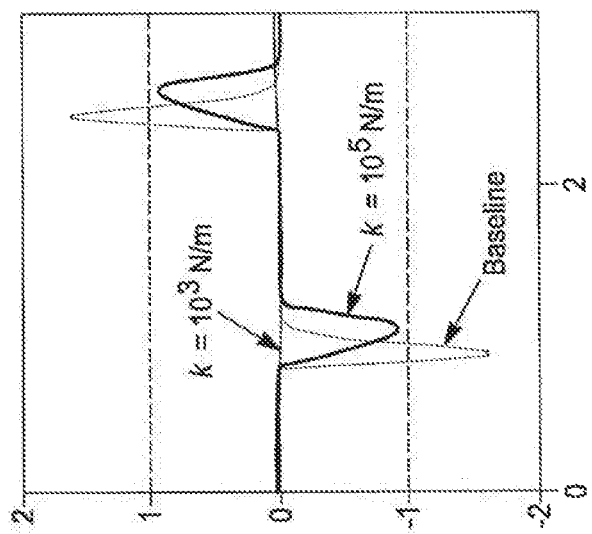
FIG. 4(b) is a graph illustrating the tracking error of the axially compliant rolling bearing stage with different compliant joint stiffness.
Figure 4A:
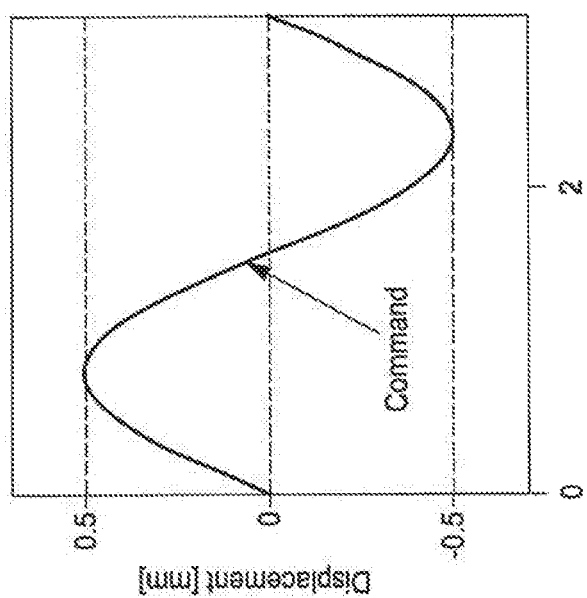
FIG. 4(a) is a graph illustrating position versus time of a typical sinusoidal displacement profile.
Figure 5:
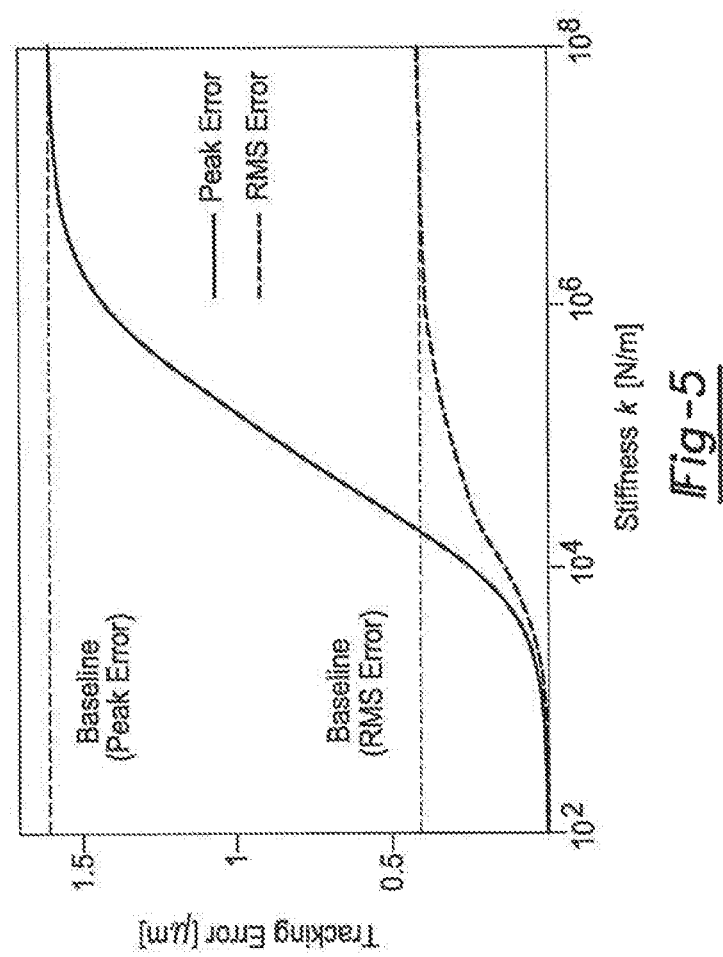
FIG. 5 is a graph illustrating the effect of compliant joint stiffness on peak and root-mean-square (RMS) tracking errors of the axially compliant rolling bearing stage.

FIG. 4 shows the simulated tracking performance of axially compliant bearing stage assembly 10, subjected to a sinusoidal reference signal with 0.5 mm amplitude and 1 mm/s maximum velocity. The baseline stage suffers from large quadrant glitches (error spikes) at velocity reversals with tracking errors reaching 1.6 μm. With compliant joints 16 of $k=10^5$ N/m and $c=238$ N·s/m, the augmented stage achieves 43% and 22% reductions in the peak and RMS tracking errors, respectively. If the compliance is further reduced to $k=10^3$ N/m, the peak and RMS errors are reduced by 98% and 95%, respectively. As shown in FIG. 5, the effect of reduced joint stiffness on reducing quadrant glitches is in agreement with the reduced settling time of point-to-point motions, indicating the present approach is able to mitigate nonlinear friction in both pre-sliding and sliding regimes.

The analysis also implies that performance of axially compliant bearing stage assembly 10 increases monotonically as the joint stiffness in the moving direction reduces for both case studies. As the stiffness reduces, the low-pass filtering effect of compliant joint 16 improves (i.e., equivalent cut-off frequency reduces), leading to better attenuation of the frictional nonlinearity.

Design of Compliant Joint

Flexure mechanism could be applied to the proposed augmented rolling bearing stage (as compliant joint 16) without the need for additional actuator and sensor. The role of compliant joint 16 is to provide some compliance between stage member 12 and bearing member 14; thus, the additional load of the substrate does not significantly affect the positioning performance of axially compliant bearing stage assembly 10. Since compliant joint 16 and bearing member 14 are arranged in series, the vertical and horizontal stiffness of compliant joint 16 in orthogonal directions have to be much larger than its axial stiffness (i.e., stiffness in the moving direction) such that the combined structure has stiffness with same order of magnitude as those of the bearing member 14 alone (i.e., high rigidity of bearing member 14 is not sacrificed). As the stiffness of compliant joint 16 in three directions are all coupled, there is clearly a tradeoff between achieving high performance in mitigating nonlinear friction (i.e., low axial stiffness) and maintaining good rigidity of bearing member 14 (high stiffness in other orthogonal directions).

A potential way of achieving very low axial stiffness is to use a hybrid joint design that combines a flexure mechanism (positive stiffness) in parallel with a negative stiffness mechanism. The idea is to design compliant joint 16 using flexure to achieve minimum axial stiffness while remaining stiff in orthogonal directions. The negative stiffness is implemented in parallel with the flexure such that the stiffness in motion direction is further reduced. Two commonly used methods to achieve negative stiffness are considered, namely a bi-stable buckled beam and permanent magnets (PMs).

Figure 6:
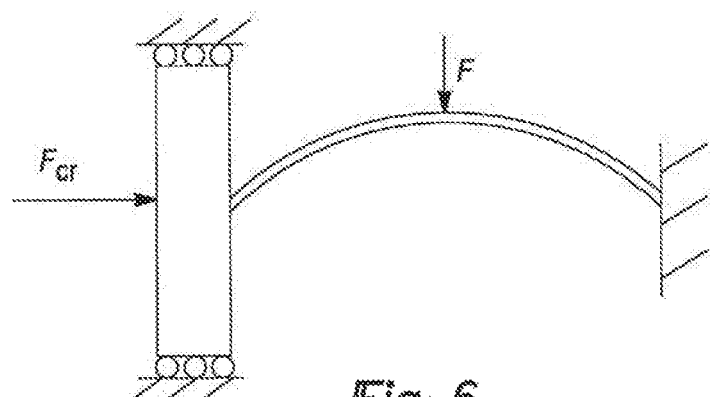
FIG. 6 is a schematic view illustrating a negative stiffness mechanism using beam buckling.

A simple negative stiffness structure can be created from a pre-compressed beam. As shown in FIG. 6, the beam is pre-loaded by a horizontal force $F_{cr}$ of magnitude greater than the critical force for the first buckling mode predicted by the Euler beam model. When another force F is applied in the motion direction, due to the buckling effect, the beam is switched from one stable state to the other (this is known as the snap-through phenomenon). The equivalent stiffness during this process is negative, which can be demonstrated both analytically and experimentally. It is suggested that if higher magnitude negative stiffness is required, large preload force has to be applied to the beam. This makes axially compliant bearing stage assembly 10 prone to structural failure or instability as a result of higher order buckling modes.

Figure 7A:
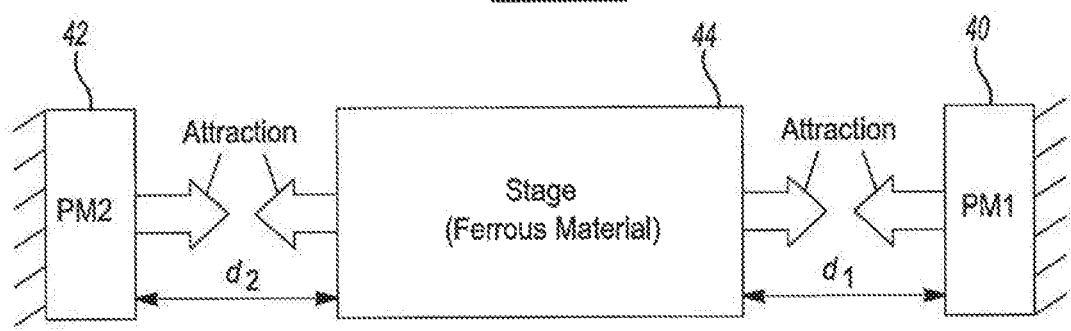
FIG. 7(a) is a schematic view illustrating a negative stiffness mechanism using attraction force between a pair of permanent magnets.

Another approach to provide the negative stiffness is through the use of permanent magnets. As shown in FIG. 7(a), a pair of equally-sized permanent magnets (PMs) 40, 42 is placed on two sides of a stage member 44 (made of ferrous material). If the distance between each PM 40, 42 and stage member 44 is equal (i.e., $d_1=d_2$), attraction forces on two sides perfectly cancel out, resulting zero net force at stage member 44. Now consider the case when stage member 44 moves slightly towards left (i.e., $d_1>d_2$), then the attraction force from the left side (i.e., between PM2 42 and stage 44) becomes larger than the force from the right side (i.e., between PM1 40 and stage 44); thus the net force moves stage member 44 further to the left. The magnitude of the equivalent negative stiffness becomes larger as the difference between two gaps becomes larger. Because of this increasing negative stiffness, the positive stiffness of the flexure has to be designed larger than the maximum negative stiffness achieved from the pair of permanent magnets to prevent collision.

Figure 7B:
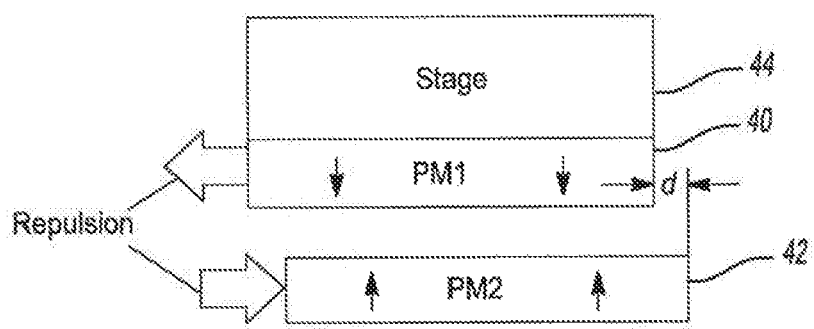
FIG. 7(b) is a schematic view illustrating a negative stiffness mechanism using repulsion force between a pair of permanent magnets.

An alternative way is to make use of the repulsion forces instead (see FIG. 7(b)); note that the polarities of PM1 40 and PM2 42 are arranged in opposite directions as indicated by the arrows. When the two permanent magnets 40, 42 are perfectly aligned (d=0), the system is at an equilibrium state, as there is no force in the horizontal direction (or moving direction). Again, assume stage member 44 moves slightly to the left, a repulsion force is generated which pushes stage member 44 further to the left. The magnitude of the negative stiffness of this embodiment is reduced as the gap between the two permanent magnets increases. Note that PM arrays, such as alternating polarity array and Halbach array, can be used in both arrangements to provide higher force densities.

Axially Compliant Bearing Design I

Figure 8:
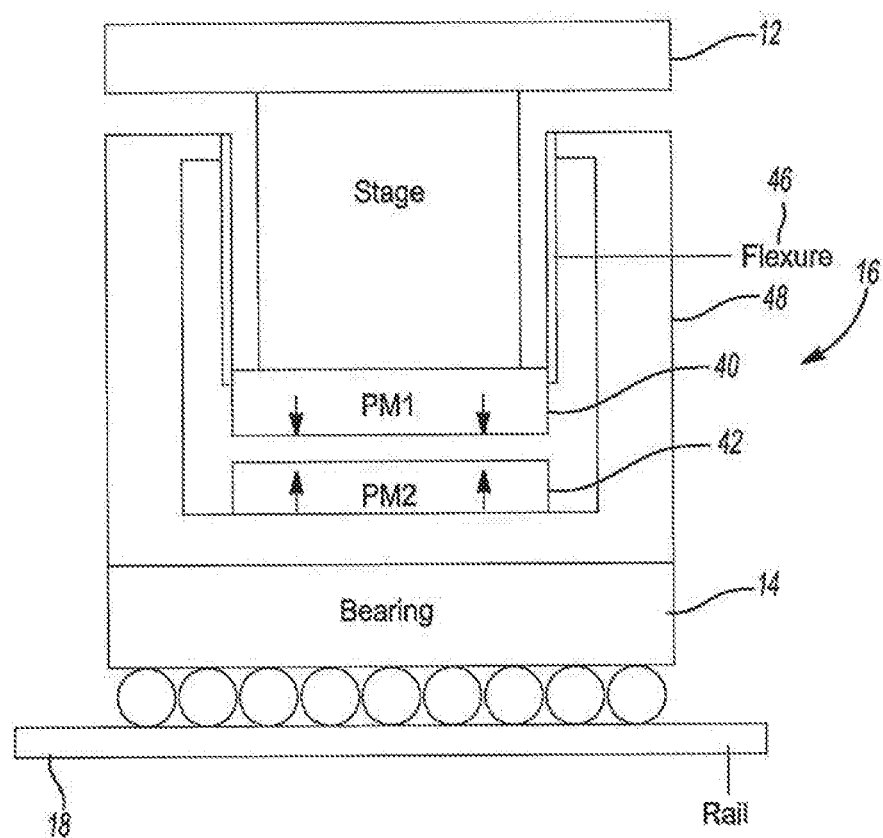
FIG. 8 is a schematic view of compliant joint design I according to the principles of the present teachings.

FIG. 8 shows the side view of a possible design of compliant joint 16 which combines a flexure mechanism 46 with a pair of permanent magnets 40, 42 (using the approach described in FIG. 7(b)). The flexure 46 is designed with a vertical leaf spring structure because of its high stiffness ratio between orthogonal directions and motion direction. Stage member 12 is mounted on the center platform where PM 40 is attached at the bottom. The bearing member 14 is mounted to the outer platform 48 where another PM 42 is attached to provide the negative stiffness in horizontal direction. The magnitude of it is comparable to the flexure 46 stiffness such that the combined structure has approximately zero stiffness when the relative motion between the bearing member 14 and stage 12 is small. Notice that the influence of effective stiffness of the PM pair in the other two directions is negligible because they are significantly smaller than the stiffness of flexure in those directions.

Figure 9:
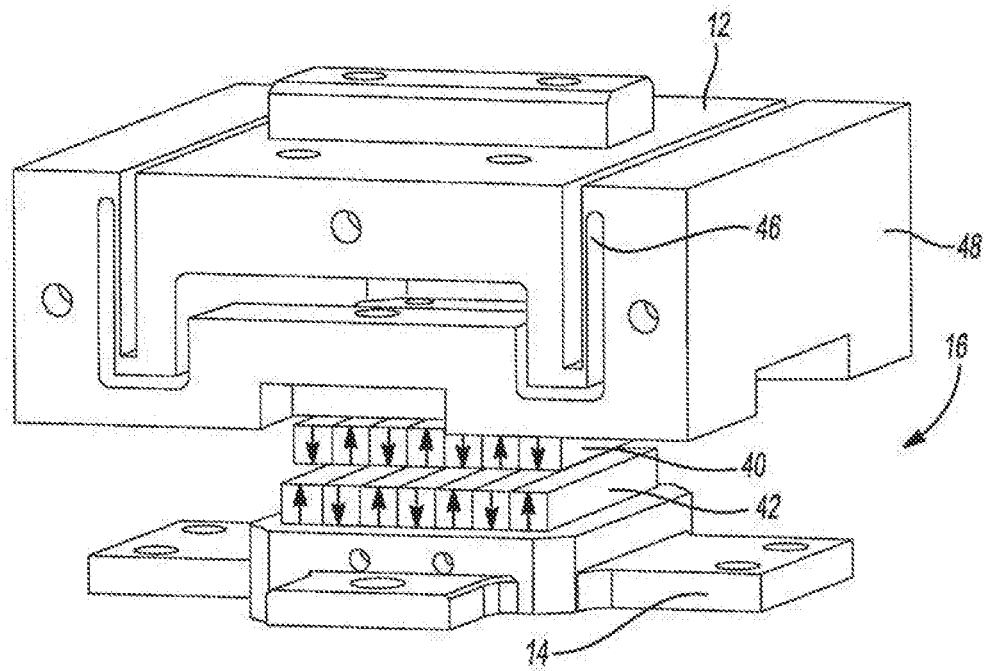
FIG. 9 is an exploded perspective view of compliant joint design I according to the principles of the present teachings.
Figure 10:
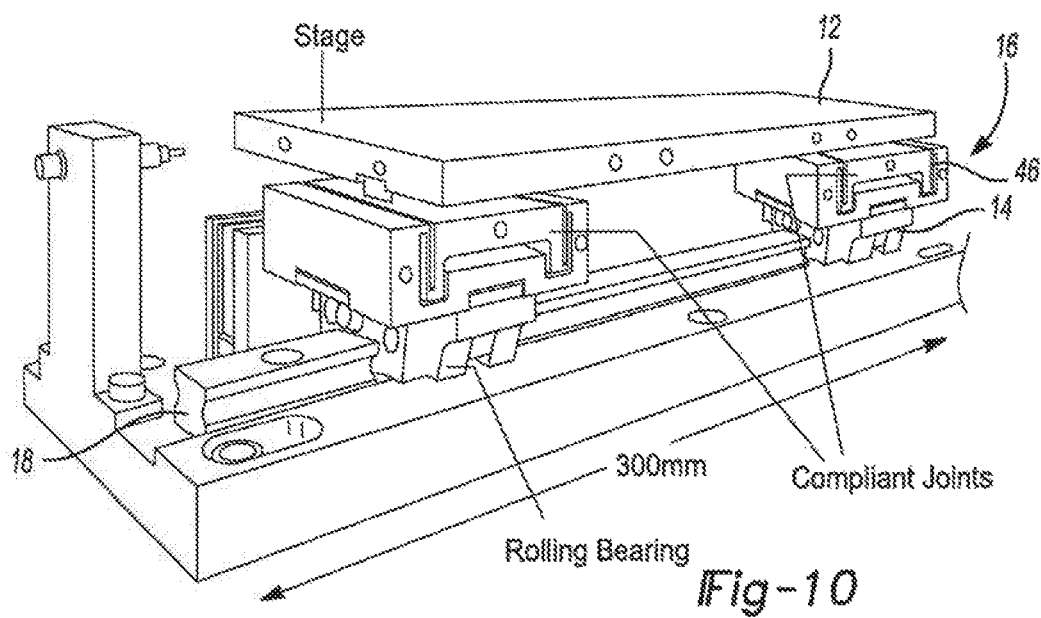
FIG. 10 is a perspective view of an axially compliant rolling bearing stage according to the principles of the present teachings.

FIG. 9 shows the detailed CAD drawing of proposed design I using SolidWorks®. Notice that small permanent magnets are arranged with alternating polarities to form the top and bottom arrays in order to increase the magnetic field strength. FIG. 10 shows the implementation of actual manufactured compliant joints 16 on an in-house built precision motion stages. Table 1 summarizes the simulated stiffness values of the flexure, PM pair, bearing member 14 and combined structure. Notice that the combined stiffness of compliant joint 16 and bearing member 14 in the vertical and horizontal directions have the same order of magnitude as those of the bearing member 14 alone, implying that the high stiffness of the bearing is not sacrificed.

TABLE 1

Stiffness values of the flexure, bearing member 14, permanent magnets and their combination [N/μm]

| | Axial | Vertical | Horizontal |
|---|---|---|---|
| Bearing member 14 | N/A | 175 | 58 |
| Flexure 46 | 0.17 | 195 | 85 |
| permanent magnets | −0.15 | 0.21 | −0.006 |
| Combined | 0.02 | 92 | 34 |

Axially Compliant Bearing Design II

Figure 11:
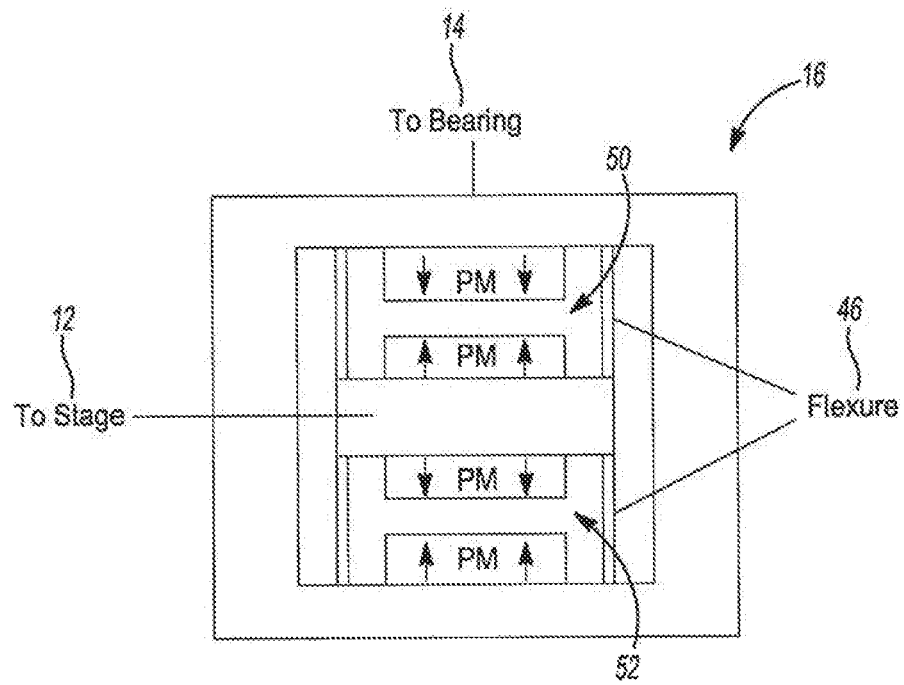
FIG. 11 is a schematic view of compliant joint design II according to the principles of the present teachings.

FIG. 11 shows the top view of an alternative design of compliant joint 16 which combines the flexure mechanism 46 with two pairs of permanent magnets 50, 52. The bearing member 14 is connected to the outer platform of compliant joint 16 and stage member 12 is attached to the central platform. Symmetric horizontal leaf springs are used to provide the positive stiffness such that the parasitic motions in the horizontal and vertical directions are minimized.

Figure 12:
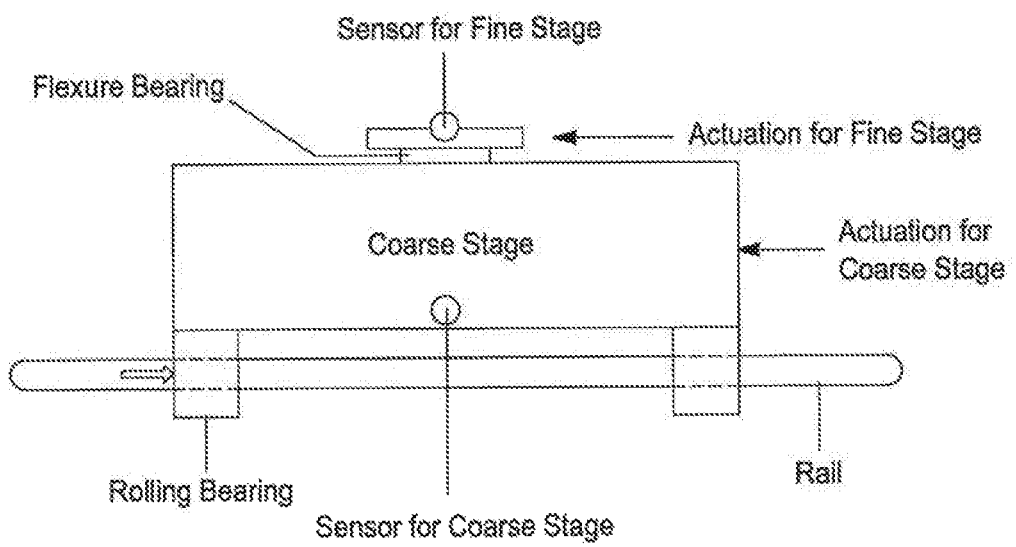
FIG. 12 is a schematic view of a coarse-fine stage according to the prior art.

Comparisons between Coarse-fine Stage and Axially Compliant Rolling Bearing Stage Assembly To achieve low-cost precision positioning with large motion range, a so-called 'coarse-fine' stage is typically used to mitigate friction phenomenon (it is typically commercially from companies like Newport, PI, Aerotech, etc. FIG. 12 shows the concept of coarse-fine stage which combines rolling bearings and flexure bearings. The rolling bearings are used to generate large-range coarse motion while the flexure bearings are used to create short-range fine (or precise) motion. In coarse-fine stage arrangements, both coarse and fine stages need to be controlled. Thus, at least two actuators and two sensors are needed. On one hand, one long-range actuator (e.g., linear motor or ball screw) drives the rolling bearing coarse stage and a sensor (e.g., linear encoder) is used to measure the coarse stage displacement. On the other hand, a short-range actuator (e.g., voice coil or piezo actuator) drives the fine stage whose displacement is measured by a high-resolution sensor (e.g., capacitive probe, laser interferometer). Because coarse-fine stage makes use of two bearings, two actuators and two sensors, they are bulky and relatively expensive. In the meantime, in order to coordinate coarse and fine stages for optimal positioning performance, complicated controllers or trajectory generation schemes are usually required. The coarse-fine stage also has limited load capacities because mass of fine stage and power of fine actuator is usually small and weak due to the limited space. The dynamics of the fine stage can be adversely affected by heavy loads from the substrate placed on it.

Figure 13:
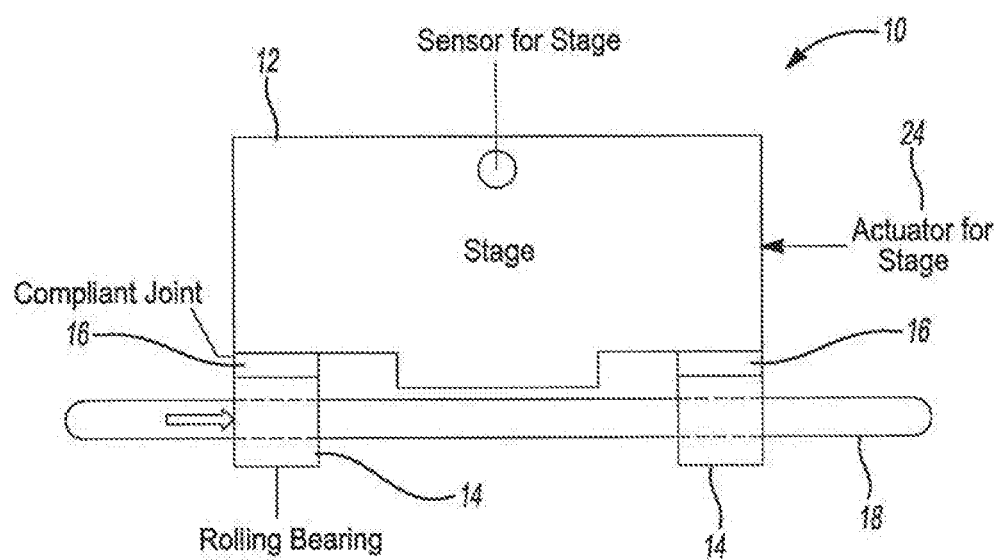
FIG. 13 is a schematic view of an axially compliant rolling bearing precision motion stage according to the principles of the present teachings.

As shown in FIG. 13, in some embodiments, axially compliant bearing stage assembly 10 makes use of compliant joint 16 (e.g., flexure) and bearing members 14 in an upside-down configuration (compared to traditional coarse-fine stages). Compliant joint 16 is used to connect stage member 12 and bearing member 14 to create a low pass filtering effect. Compliant joint 16 allows fine positioning (or small motion) even when the bearing member 14 gets 'stuck' due to friction, which mitigates the nonlinear friction effect of conventional bearing member 14. Since only the main stage needs to be precisely controlled, only one actuator and one sensor is needed for the present invention. Thus, cost of axially compliant bearing stage assembly 10 is significantly reduced, compared to the coarse-fine stage. In the meantime, axially compliant bearing stage assembly 10 has much better load capacity since the stage has relatively large mass and a powerful actuator is used to directly actuate the stage 12.

Rotary Compliant Applications

Figure 14:
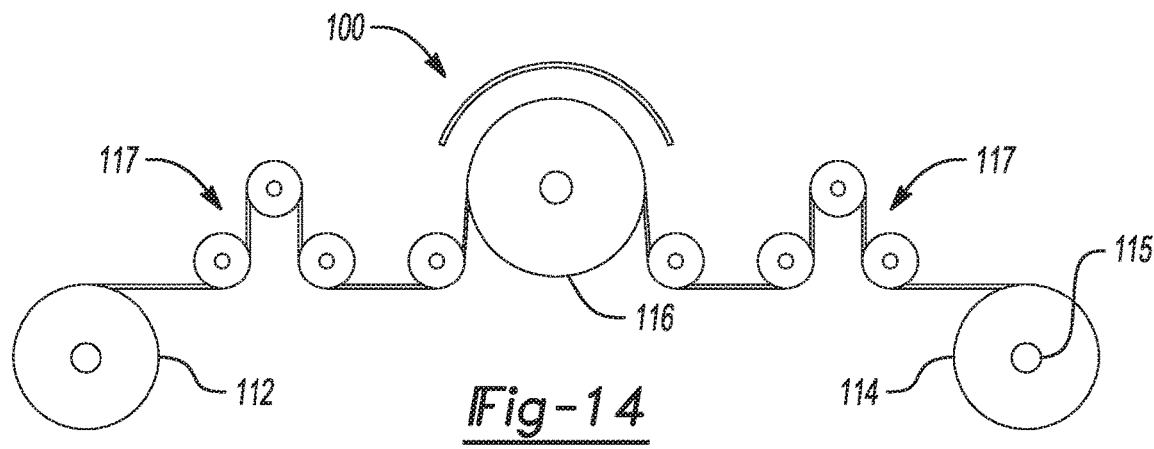
FIG. 14 is a schematic view of an rotationally compliant bearing roller assembly according to the principles of the present teachings.

Roll-to-roll manufacturing processes, that pattern and coat electronic functional materials on plastic films via a roll-to-roll processing system 100 (see FIG. 14), are considered as low-cost and high throughput technologies to manufacture flexible and large-area thin film electronics, such as organic photovoltaics, thin film transistors, light-emitting diodes, sensors and fuel cells. In a roll-to-roll manufacturing system 100, processes are carried out by transporting a plastic film 110 continuously from unwinder 112 to winder 114 via a drive system 115 operably coupled with the winder 114 or other portion of system 100. For this purpose, the processing roller 116 is generally controlled by drive system 115 to move at constant velocity (CV) while tension of the plastic media film 110 is controlled by the unwinder 112 and winder 114 and/or tension loadcell 117. Precision (i.e., tracking accuracy) of the processing roller 116 during CV motion is crucial to the performance of roll-to-roll system 100 because the resulting positioning error directly affects the quality of the manufactured products. For example, successive print patterns are often aligned with the previously printed patterns on the film 110 (also known as print registration) and tracking error of the processing roller 116 during CV motions may cause position misalignment on the successive patterns in the film transport direction. Therefore, registration requirement is very tight for printed electronics—typically, on the order of a few micrometers.

During CV motions, tracking performance is mainly affected by two types of disturbances. The first disturbance is position-dependent driving torque ripple caused by cogging forces, reluctance forces, unbalanced phase forces, phase misalignment, and current offset from a servo motor. Torque ripple occurs in a periodic manner with fundamental frequency determined by the pole pitch of the motor. As a result, the dominant peak of torque ripple can be effectively suppressed using force observer and/or model-based compensation. The second disturbance is caused by friction fluctuation as the balls of the guiding bearings roll inside the grooves.

Although there have been a few studies on mitigating the undesirable effects of friction fluctuations on the tracking performance of the system during CV motions, they have not addressed the remaining broadband disturbances (at low-to-medium frequency) that pose significant challenges to a conventional servo controller, hampering the tracking performance of the system.

According to the principles of the present teachings, one or more rotary compliant joints 120, also referred to as friction isolator (FI), is employed with processing roller 116 to provide a robust and cost-effective mechatronics approach similar to that described herein in connection with the undesirable effects of friction on linear nanopositioning (NP) stages with mechanical bearings. The fundamental concept of rotary compliant joint 120 is to connect the mechanical bearings to a processing roller 116 using a joint that is very compliant in the motion direction (i.e. rotational direction about a rotational axis) and less compliant in a direction orthogonal to the motion direction, thus, effectively isolating the stage from bearing friction. It has been demonstrated that rotary compliant joint 120 significantly reduces the settling times and quadrant glitches of roller 116 with mechanical bearings during point-to-point motions and circular motions, respectively. The present teachings describe the benefits of rotary compliant joint 120 on mitigating the effects of friction fluctuations on the precision of continuous roll-to-roll manufacturing systems, in particular, the processing roller 116.

Compliant Joint Rotary System

Figure 15A:
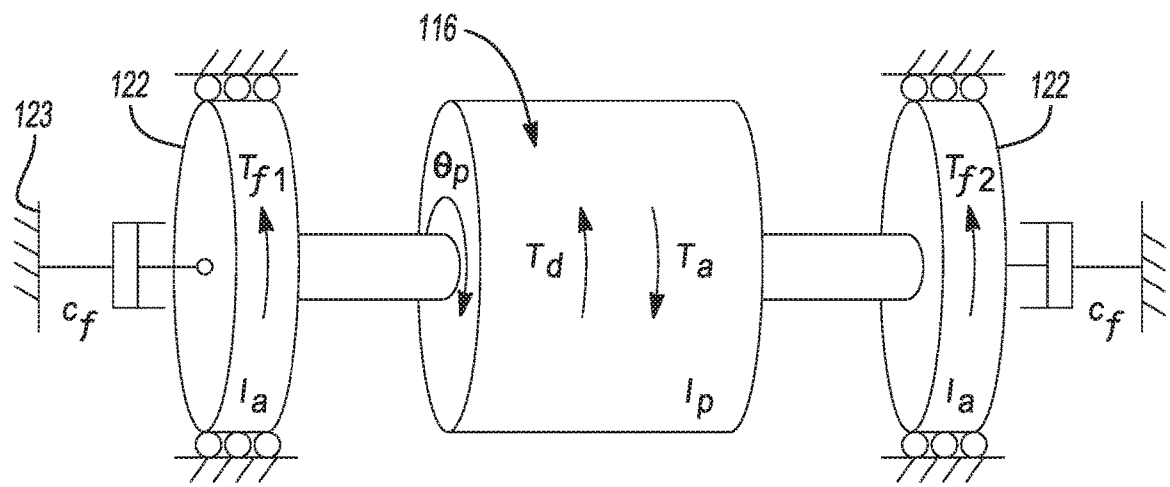
FIG. 15A is a schematic perspective view of a conventional rotary system for roll-to-roll manufacturing.
Figure 15B:
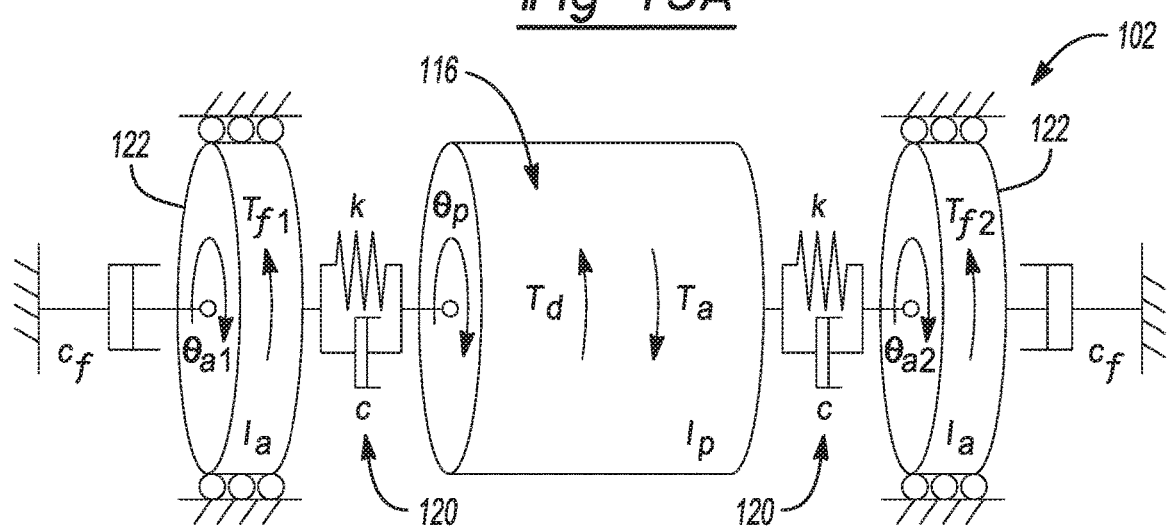
FIG. 15B is a schematic perspective view of a rotary system for roll-to-roll manufacturing having a rotary compliant joint according to the principles of the present teachings.

FIG. 15A illustrates a schematic of a conventional rotary system for roll-to-roll manufacturing. The processing roller 116 of inertia $I_p$ is guided by a pair of rotary ball bearings 122, each of inertia $I_a$, rotationally mounted or otherwise joined to a base or other structure 123 to support rotational movement about a rotational axis. The viscous friction coefficient between the sliding surfaces of the bearings 122 is denoted as $c_f$. Disturbances during constant velocity (CV) motions due to friction fluctuations are modeled as torques $T_{f1}$ and $T_{f2}$; $T_a$ and $T_d$ are respectively the motor driving torque and other miscellaneous disturbances such as motor torque ripple and process induced disturbance. However, FIG. 15B illustrates a schematic of a rotationally compliant bearing roller assembly 102 (also referred to as compliant joint rotary system 102) for high precision roll-to-roll manufacturing. Rather than being rigidly attached to the processing roller 116 (as illustrated in FIG. 15A), the inner rings of the ball bearings 122 are connected using rotary compliant joints 120 of stiffness k and damping coefficient c. The rotary compliant joints 120 provide sufficient compliance in the motion direction (i.e., θ) while remaining stiff in other off-motion directions. Note that $\theta_p$, $\theta_{a1}$ and $\theta_{a2}$ are the angular positions of the processing roller 116 and two rotary bearings 122, respectively.

Assuming rigid body behavior, the plant dynamics (i.e., transfer function from motor driving torque to angular position of the processing roller 116) can be derived as $$G_{p,R} = \frac{1}{(I_p + 2I_a)s^2 + 2c_f s} \quad (1)$$

$$G_{p,Fl} = \frac{I_a s^2 + (c + c_f)s + k}{a_4 s^4 + a_3 s^3 + a_2 s^2 + a_1 s};$$

$$a_4 = I_p I_a; a_3 = c(I_p + 2I_a) + c_f I_p;$$

$$a_2 = k(I_p + 2I_a) + 2cc_f; a_1 = 2kc_f$$

where s is the Laplace variable, and subscripts R and FI denote the cases without and with rotary compliant joint 120, respectively. Similarly, the open loop transfer function from frictional disturbance to angular position of the roller 116 (assuming $T_{f1}=T_{f2}$) can be obtained as $$D_{d,R} = 2G_{p,R} \quad (3)$$

$$D_{d,Fl} = 2G_{p,Fl} \frac{cs+k}{I_a s^2 + (c+c_f)s + k} \quad (4)$$

Observe that in a conventional rotary system, the frictional disturbance directly affects the stage dynamics, jeopardizing precision of the processing roller 116. In the compliant joint rotary system 102, the undesirable effects of friction fluctuations are mechanically low-pass filtered through the additional dynamics introduced by the rotary compliant joints 120. However, note that high enough $c+c_f$ is needed to avoid large amplitude at the dominant resonance of the rotary compliant joints 120. Large values of c reduce the low-pass filtering effect at frequency regions beyond the dominant resonance due to the presence of c in the numerator of $D_{d,Fl}$. Therefore, it is more desirable to increase $c+c_f$ by increasing $c_f$.

Frequency Domain Analysis

Figure 16:
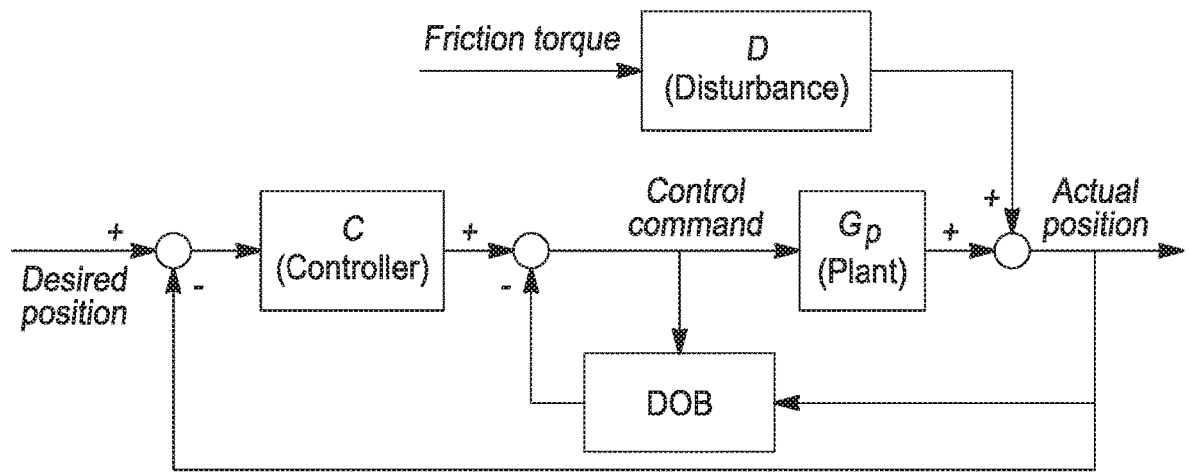
FIG. 16 is a schematic view of a control system for controlling the rotationally compliant bearing roller assembly of the present teachings.

To further illustrate the benefits of rotary compliant joint 120 in mitigating the undesirable effects of frictional disturbance, frequency domain analysis is carried out. As illustrated in FIG. 16, an industrial standard PID controller is used to control the motion of processing roller 116; it is tuned to 100 Hz closed loop bandwidth. Since the feedback controller has limited ability in rejecting disturbances, an inverse-model-based disturbance observer (DOB) is implemented to further attenuate the low frequency disturbances due to frictional variations; it is tuned to 80 Hz bandwidth. The closed loop transfer function from frictional disturbance to roller position is then obtained $$G_{d,R} = \frac{D_R G_n (1-Q)}{Q(G_{p,R} - G_n) + G_n(1 + CG_{p,R})} \quad (5)$$

$$G_{d,Fl} = \frac{D_{Fl} G_n (1-Q)}{Q(G_{p,Fl} - G_n) + G_n(1 + CG_{p,Fl})}$$

where C is the feedback (PID) controller (the derivative action is low-pass filtered using a first order filter with time constant τ), Q is a low-pass filter to guarantee the stability of the DOB, and $G_n = G_{p,R}$ is the nominal plant model that describes the low-frequency characteristics of the conventional rotary system (dominated by rigid body dynamics). They are given by $$C = K_p + \frac{K_d s}{\tau s + 1} + \frac{K_i}{s} \quad (6)$$

$$Q = \frac{(2\pi f_Q)^2}{(s + 2\pi f_Q)^2} \quad (7)$$

TABLE I

Parameters of the Rotary System

| Parameters | Value |
| --- | --- |
| $I_p$ | 0.15 kgm² |
| $I_a$ | 0.015 kgm² |
| $K_p$ | 1.54 × 10⁴ N/rad |
| $K_d$ | 81.62 Ns/rad |
| $K_i$ | 6.16 × 10⁵ N/rad · s |
| $T_f$ | 0.0005884 s |
| $f_Q$ | 80 Hz |

Figure 17A:
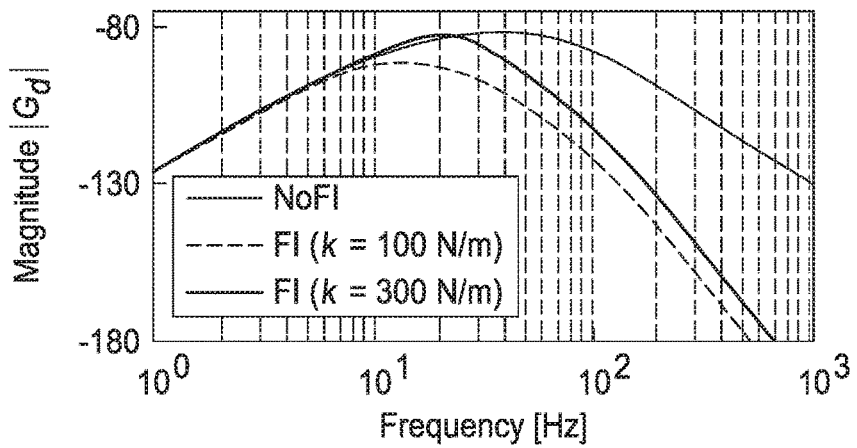
FIGS. 17A and 17B are frequency versus magnitude graphs for different stiffness k; for configurations without and with rotary compliant joints, respectively.
Figure 17B:
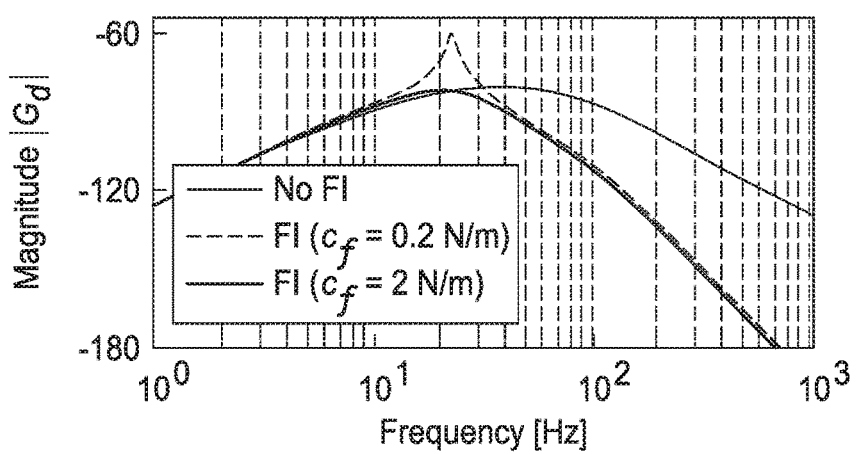

FIGS. 17A and 17B compare the magnitudes of $G_{d,R}$ and $G_{d,Fl}$ using different stiffness k for rotary compliant joint 120 (FI). Note that a modal damping of 0.1% is introduced to account for the damping of the rotary compliant joint 120 (i.e., c) and the remaining parameters are summarized in Table I. Observe that the frictional disturbance in the high frequency region is effectively suppressed by rotary compliant joint 120, thanks to its low-pass filtering effect. The benefits of rotary compliant joint 120 become more dominant when the stiffness is reduced since the magnitude of $G_{d,Fl}$ rolls off after the resonance peak. In other words, a lower stiffness rotary compliant joint 120 leads to better mitigation of frictional disturbance. FIG. 17B shows the influence of viscous friction (cf) on the effectiveness of rotary compliant joint 120. Since rotary compliant joint 120 often has limited damping, the resonance peak has very large amplitude if the frictional damping is small. This poses significant challenge since the dominant resonance can be easily excited (e.g., by friction variation), generating large position errors. Therefore, a high damping coefficient at the bearing location is necessary to attenuate the resonance peak and achieve the desired performance of rotary compliant joint 120.

Design of Rotary System 102 with Rotary Compliant Joint 120

Figure 18A:
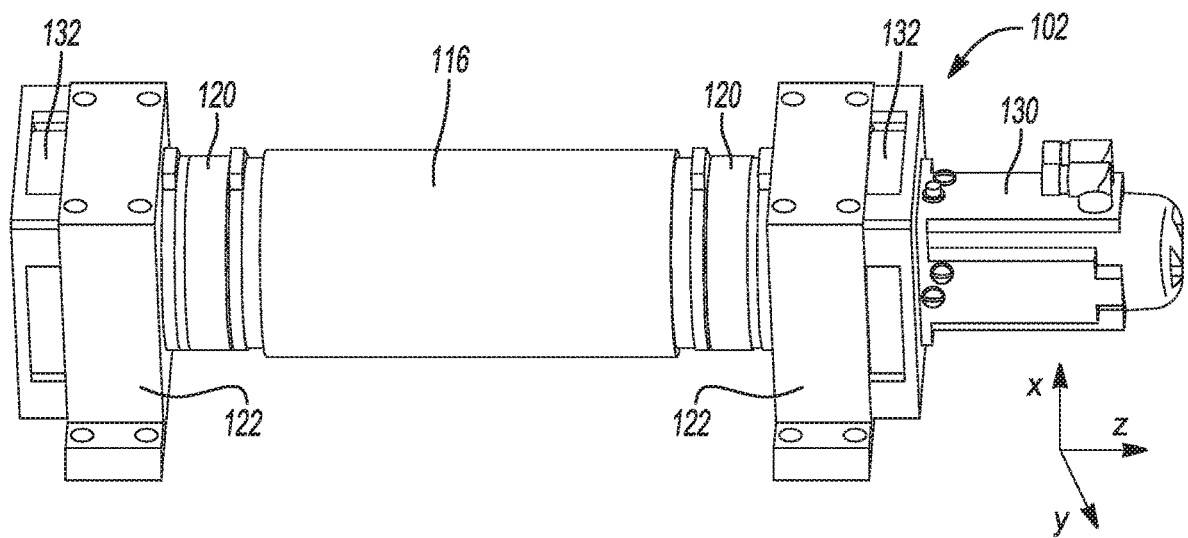
FIG. 18A is a perspective view of a compliant joint rotary system according to the principles of the present teachings.
Figure 18B:
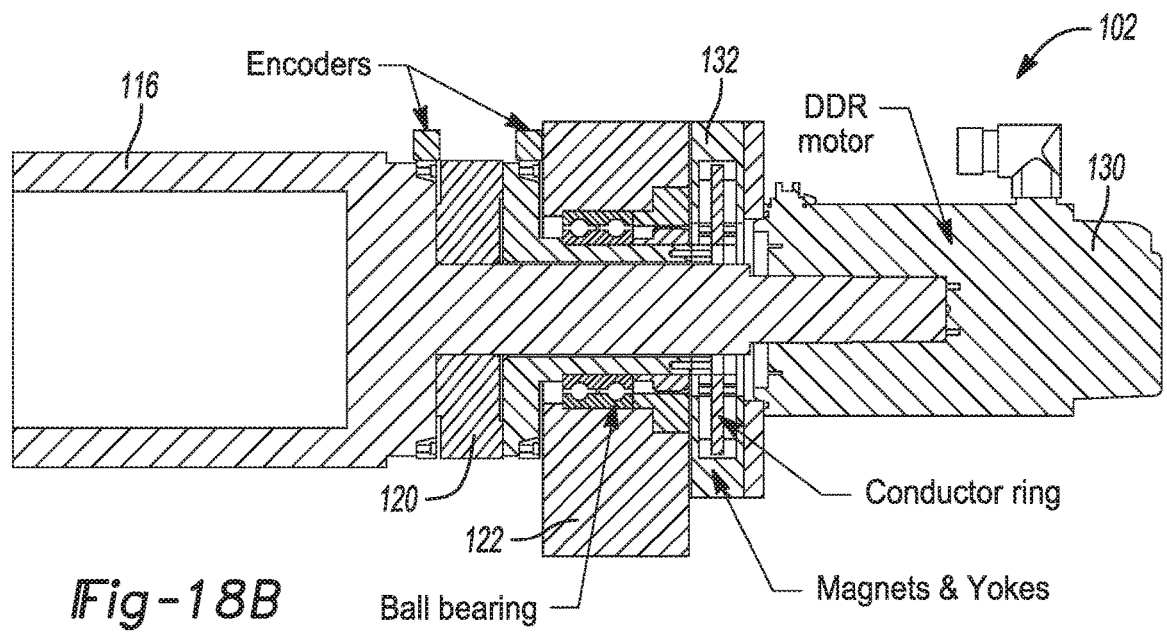
FIG. 18B is an enlarge cross-sectional view of the compliant joint rotary system according to the principles of the present teachings.

To validate the present embodiment, a compliant joint rotary system 102 is constructed as illustrated in FIGS. 18A-18B. The processing roller 116, having a diameter (for example) of 160 mm, is guided by a pair of angular contact ball bearings 122 (NSK, 7013A). A direct-drive rotary (DDR) motor 130 (Kollmorgen, C042A) is used to drive the system. Rotary compliant joints 120, according to the principles of the present teachings, are used to connect the processing roller 116 to the inner rings of the bearings 122.

A rotary eddy current mechanism 132 is implemented to achieve the desired viscous damping at the bearing location, as discussed in the next section.

Design of Rotary Compliant Joint 120

Figure 19A:
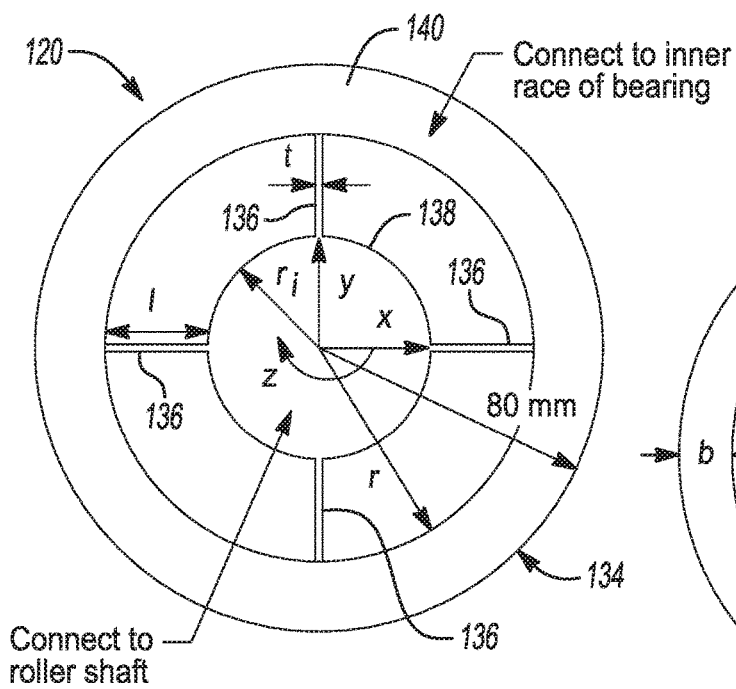
FIGS. 19A and 19B are a side and perspective view of a rotary compliant joint, in the form of a symmetric cartwheel flexure mechanism, according to the principles of the present teachings.
Figure 19B:
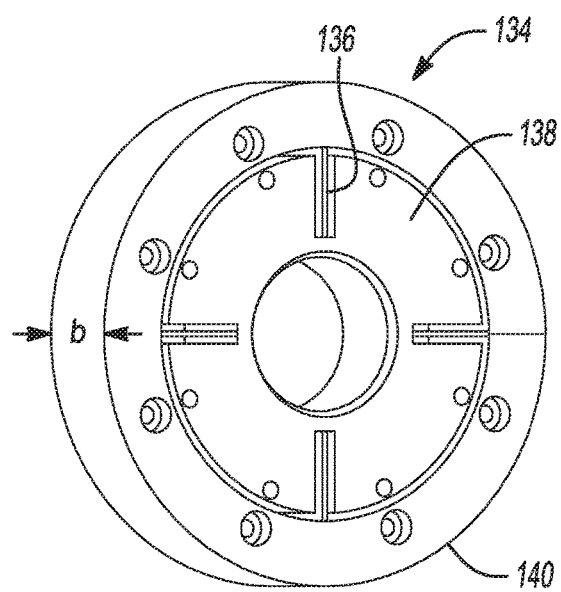

As illustrated in FIGS. 19A-19B, in some embodiments, a symmetric cartwheel flexure (SCF) mechanism 134 with four flexure leaf springs 136 is adopted for rotary compliant joint 120; the center platform 138 of the SCF mechanism 134 is connected to the processing roller 116 and the outer platform 140 is connected to the inner ring of the ball bearing 122. The symmetric structure of SCF mechanism 134 reduces drift of the rotation center during motion. In addition, the over-constrained flexure mechanism effectively improves rigidity in off-motion directions.

To achieve the desired attenuation of frictional disturbance, the rotary compliant joint 120 should have minimal stiffness in the motion direction (i.e., $\theta_z$). In the meantime, it must maintain high stiffness in the off-motion directions (e.g., radial directions), so as not to overly sacrifice the rigidity of the ball bearing. Therefore, the parameters of the SCF mechanism 134, specifically, leaf length l, leaf thickness t, leaf width b, and outer platform radius r are optimized to maximize the stiffness ratios between off-motion directions and motion direction while satisfying other design constraints (e.g., maximum stress and dimension). Let us denote $K_{11}$-$K_{66}$ as the stiffness of the SCF mechanism 134 in the x, y, z, $\theta_x$, $\theta_y$, and $\theta_z$, directions; the objective can then be expressed as $$\text{Maximize } K_{ll}/K_{66} \text{ where } l=1,\ldots,5 \quad (8)$$

There are several constraints regarding the stiffness, stress and dimension limitations of the flexure mechanism. First of all, the axial and radial stiffness of the SCF should be of similar order of magnitude as the ball bearings so as not to overly sacrifice the rigidity of the system. Therefore, for purposes of illustration and not intending to be limiting on the present teachings, the following constraints are imposed to fulfill the stiffness requirement in an exemplary configuration based on the approximated off-motion stiffness of ball bearings from the manufacturer's (e.g., NSK) catalog $$K_{11}, K_{22} \text{ and } K_{33} \geq 120 \text{ N/}\mu\text{m} \quad (9)$$

Secondly, certain dimensional limitations are imposed on this 22xemplary design of SCF since to fit into an exemplary designed rotary system:

$$30 \text{ mm} \leq r_1 < r \leq 60 \text{ mm (where } r_1 = r - 1) \quad (10)$$

$$0 < b \leq 30 \text{ mm} \quad (11)$$

$$0.5 \text{ mm} \leq t \leq l/10 \quad (12)$$

Eq. (10) indicates that the center 138 and outer 140 platforms of SCF mechanism 134 should have large enough radius to prevent excessive deformation under loading. Note that the overall radius of the processing roller 116 in this example is set to 80 mm such that a sample length of 500 mm can be processed by a single turn. Furthermore, in Eq. (11), the width of the SCF mechanism 134 is constrained to limit the overall length of the drive shaft and prevent low torsional stiffness. Finally, the thickness of the flexure leaf springs 136 is constrained to avoid manufacturing issues while maintaining thin beam assumption.

To facilitate the design optimization, the stiffness of SCF mechanism 134 is derived analytically. Note that the non-linear stiffening effect of the over-constrained flexure is ignored in this model for simplicity and the off-diagonal terms in the stiffness matrix become zero as a result of the symmetric structure of the SCF mechanism 134. The remaining diagonal terms are given by $$K_{11} = K_{22} \approx 2\alpha\beta El \quad (13)$$

$$K_{33} \approx \frac{4\alpha\beta^3 El}{B} \quad (14)$$

$$K_{44} = K_{55} \approx \frac{\alpha\beta^3 El^3}{6}\left(1 + \frac{2\xi - 1}{B}\right) \quad (15)$$

$$K_{66} \approx \frac{2\alpha^3 \beta \xi El^3}{3} \quad (16)$$

where E is the Young's modulus, u is the Poisson's ratio and the non-dimensional parameters are described as follows $$\alpha = \frac{t}{l}; \beta = \frac{b}{l}; \gamma = \frac{r}{l}; \gamma_i = \frac{r_i}{l}; \quad (17)$$

$$\xi = 2 + 6\gamma(\gamma - 1) = 2 + 6\gamma_i(\gamma_i + 1);$$

$$B = 1 + \frac{12\beta^2(1+v)}{5}$$

The stiffness ratios of off-motion directions over motion direction can then be calculated as $$\frac{K_{11}}{K_{66}} = \frac{K_{22}}{K_{66}} \approx \frac{3}{\alpha^2 l^2 \xi} \quad (18)$$

$$\frac{K_{33}}{K_{66}} \approx \frac{6\beta^2}{\alpha^2 l^2 \xi B} \quad (19)$$

$$\frac{K_{44}}{K_{66}} = \frac{K_{55}}{K_{66}} \approx \frac{\beta^2}{4\alpha^2 \xi}\left(1 + \frac{2\xi - 1}{B}\right) \quad (20)$$

Before stepping into detailed optimization, sensitivity analysis is carried out to illustrate the effects of different design parameters on the objective. Observe from Eq. (13)-(16) and (18)-(20) that increasing β always leads to higher off-motion stiffness as well as higher stiffness ratios between $K_{33}$-$K_{55}$ and $K_{66}$. This indicates that should be set to its upper limit. Therefore, b=30 mm is used to achieve the largest possible β given a fixed l. Similarly, as ξ decreases, the stiffness ratios are increased without affecting the off-motion stiffness $K_{11}$-$K_{33}$. Since monotonically increases for $\gamma_i$ (or $r_i$)>0, $r_i$ is set to its lower limit of 30 mm to minimize ξ. As a result, the design problem is simplified to find the optimal parameters for l and α.

Figure 20:
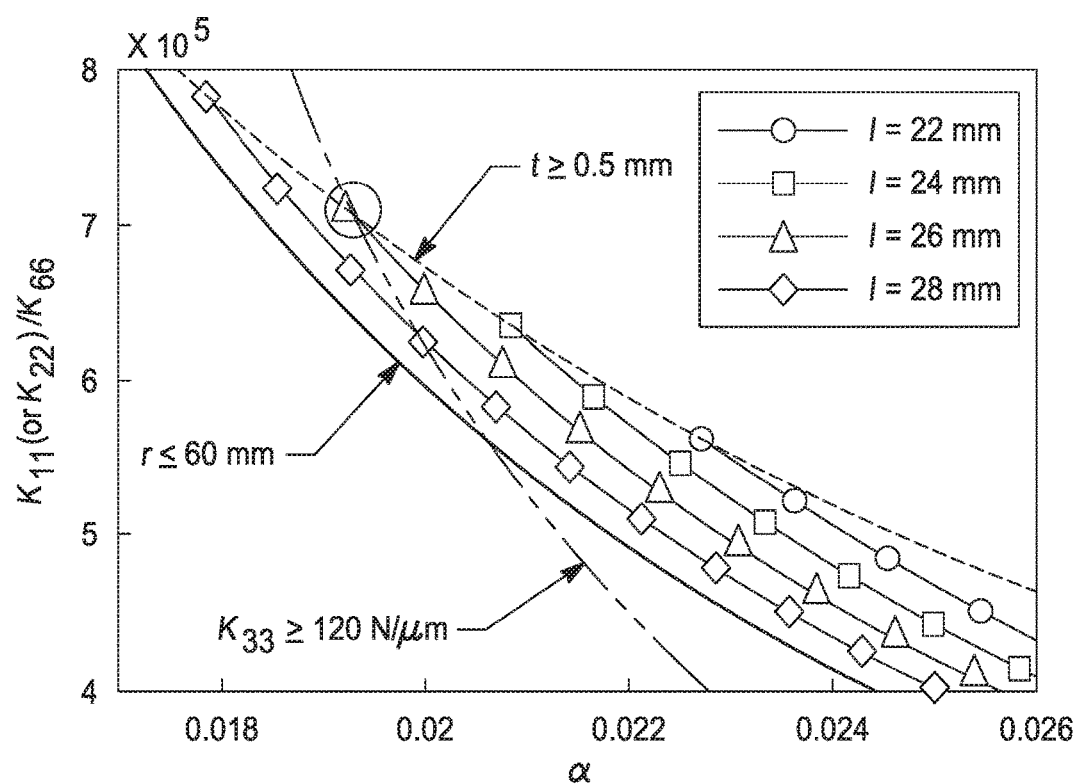
FIG. 20 illustrates the calculated stiffness ratio of $K_{11}$ (and $K_{22}$) over $K_{66}$ as a function of $\alpha$ and l.

FIG. 20 illustrates the calculated stiffness ratio of $K_{11}$ (and $K_{22}$) over $K_{66}$ as a function of α and l. Observe that reducing a leads monotonically increased stiffness ratio at a fixed l. Therefore, t should be set to its lower limit of 0.5 mm to achieve a minimum a. Although a larger l generally enables the choice of a lower α, thus, higher stiffness ratio, it cannot be arbitrary increased due to the existence of other design constraints. By plotting the active geometry and stiffness constraints from Eq. (9)-(12), the stiffness ratio of $K_{11}$ (and $K_{22}$) over $K_{66}$ is maximized at a leaf length (l) of 26 mm (highlighted by the red circle in FIG. 8). Similar behavior is observed for other stiffness ratios and exactly the same optimal parameters are obtained for α and l—see Table II.

TABLE II

Optimal Parameters of Designed FI in Exemplary Configuration

| Parameters | Value |
|---|---|
| l | 26 mm |
| b | 30 mm |
| t | 0.5 mm |
| r | 56 mm |

Briefly, in some embodiments, rotary eddy current mechanism 132, the permanent magnets can be arranged in a circumferential direction, which is similar to that of a doubled-sided linear motor. A rotating disc can be placed between the upper and lower magnetic arrays and viscous damping torque can be achieved due to the interaction of eddy current and magnetic field. In some embodiments, the eddy current mechanism 132 is configured to provide negative stiffness in the rotational direction. In some embodiments, the eddy current mechanism 132 is configured to provide rotational damping.

Experimental Validation of Rotary Compliant Joint System

As part of experimental validation of the compliant joint rotary system 102 and rotary compliant joint 120, rotary system 102 was constructed in accordance with the present teachings. It was determined that the introduction of rotary compliant joint 120 greatly attenuates the frictional disturbance with frequency components above its dominant resonance, making it much easier for a disturbance observer (DOB) of the same bandwidth to suppress the remaining low frequency disturbance. As a result, the tracking error of the compliant joint rotary system 102 at high-speed motion was significantly smaller than that of the case without rotary compliant joint 120. In addition, the introduction of rotary compliant joint 120 enabled the use of a DOB with much higher bandwidth, leading to up to 61% reduction in RMS error when compared to the case without rotary compliant joint 120. The tracking performance of the friction-isolated system also remains largely unchanged as the speed of the processing roller 116 varies, indicating that the present teachings are very robust.

CONCLUSION

According to the present teachings, a novel rotary servo system for achieving high precision continuous roll-to-roll manufacturing has been provided. The present system integrates a rotary compliant joint 120 (friction isolator (FI)), a mechanical component, to mitigate the undesirable effects of friction on the tracking performance of the processing roller 116 during constant velocity motions, thus improving the quality of the manufactured products. It has been demonstrated through frequency domain analysis that rotary compliant joint 120 improves the disturbance rejection ability of the system by low-pass filtering the frictional disturbance of the supporting bearings. It has been demonstrated in experiments that the compliant joint rotary system achieves up to 61% reductions in RMS tracking error during CV motions of different speed, compared to a conventional rotary system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rotationally compliant bearing roller assembly comprising:
    a roller;
    at least one bearing member operably coupled to a base configured to support rotational movement about a rotational axis; and
    a rotary compliant joint interconnecting the at least one bearing member to the roller, the rotary compliant joint having a first compliance in a rotational direction about the rotational axis to permit movement of the roller in the rotational direction relative to the at least one bearing member, the rotary compliant joint having a second compliance in a direction orthogonal to the rotational direction, the second compliance being less than the first compliance.

2. The rotationally compliant bearing roller assembly according to claim 1 further comprising:
    actuating drive system configured to cause the roller to rotate about the rotational axis in the rotational direction.

3. The rotationally compliant bearing roller assembly according to claim 1 further comprising:
    actuating drive system configured to move a media film over the roller thereby causing the roller to rotate about the rotational axis in the rotational direction.

4. The rotationally compliant bearing roller assembly according to claim 1 further comprising:
    a sensor for measuring motion of the roller.

5. The rotationally compliant bearing roller assembly according to claim 1 wherein the rotary compliant joint comprises a flexure mechanism.

6. The rotationally compliant bearing roller assembly according to claim 5 wherein the flexure mechanism comprises a first member coupled to the at least one bearing member, a second member coupled to the roller, and one or more compliant members interconnecting the first member and the second member.

7. The rotationally compliant bearing roller assembly according to claim 6 wherein the one or more compliant members comprises a plurality of leaf springs coupled between the first and second member.

8. The rotationally compliant bearing roller assembly according to claim 7 wherein each of the plurality of leaf springs provides compliant movement in the rotational direction and inhibits compliant movement in directions perpendicular to the rotational directions.

9. The rotationally compliant bearing roller assembly according to claim 5 wherein the flexure mechanism provides positive stiffness in the rotational direction and negative stiffness in the rotational direction.

10. The rotationally compliant bearing roller assembly according to claim 5 wherein the stiffness of the flexure mechanism in directions perpendicular to the rotational direction has greater magnitude than the stiffness of the flexure mechanism in the rotational direction.

11. The rotationally compliant bearing roller assembly according to claim 5 wherein an engage and disengage mechanism is applied to the flexure mechanism between the roller and the at least one bearing member.

12. The rotationally compliant bearing roller assembly according to claim 1 wherein the at least one bearing member comprising a pair of bearing members slidably operably coupled to the base configured to support the rotational movement of the roller about the rotational axis.

13. The rotationally compliant bearing roller assembly according to claim 1 wherein the combined stiffness of the rotary compliant joint and the at least one bearing member in a first direction perpendicular to the rotational direction and a second direction perpendicular to the rotational direction has the same order of magnitude as the stiffness of the at least one bearing member alone in the first direction and the second direction.

14. The rotationally compliant bearing roller assembly according to claim 1 wherein a damper is coupled to the rotary compliant joint to increase the damping coefficient in the rotational direction.

15. The rotationally compliant bearing roller assembly according to claim 1 wherein a control system provides active damping control signal through the drive system of the roller to increase the damping between the roller and the at least one bearing member.

16. The rotationally compliant bearing roller assembly according to claim 1 wherein the rotary compliant joint comprises an eddy current mechanism.

17. The rotationally compliant bearing roller assembly according to claim 16 wherein the eddy current mechanism is configured to provide negative stiffness in the rotational direction.

18. The rotationally compliant bearing roller assembly according to claim 16 wherein the eddy current mechanism is configured to provide rotational damping.

\* \* \* \* \*